United States Patent
Sugiyama

(10) Patent No.: US 6,421,203 B1
(45) Date of Patent: Jul. 16, 2002

(54) MAGNETIC TAPE CASSETTE SLIDER LOCK MECHANISM WITH TAPERED SURFACES AND COIL SPRING BIAS

(75) Inventor: Masanobu Sugiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 07/966,707

(22) Filed: Oct. 26, 1992

(30) Foreign Application Priority Data

Oct. 30, 1991 (JP) ............................................. 3-097379
Oct. 30, 1991 (JP) ............................................. 3-097380

(51) Int. Cl.$^7$ ............................................. G11B 23/02
(52) U.S. Cl. ................................................. 360/132
(58) Field of Search .................. 360/132; 242/198, 242/199, 347.1; 206/387

(56) References Cited

U.S. PATENT DOCUMENTS

| | | | | |
|---|---|---|---|---|
| 4,660,784 A | * | 4/1987 | Sumida et al. | 360/132 |
| 4,673,145 A | * | 6/1987 | Emori | 360/132 |
| 4,697,702 A | * | 10/1987 | Urayama | 360/132 |
| 4,714,213 A | * | 12/1987 | Watanabe et al. | 242/198 |
| 4,733,316 A | * | 3/1988 | Oishi et al. | 360/132 |
| 4,853,816 A | * | 8/1989 | Satoh et al. | 360/132 |
| 5,140,488 A | * | 8/1992 | Sugiyama et al. | 360/132 |
| 5,143,317 A | * | 9/1992 | Sugiyama | 242/198 |
| 5,144,511 A | * | 9/1992 | Katagiri et al. | 360/132 |

FOREIGN PATENT DOCUMENTS

| | | |
|---|---|---|
| EP | 0163293 | 12/1985 |
| JP | 62189687 | 8/1987 |
| JP | 62267986 | 11/1987 |
| JP | 63304487 | 12/1988 |
| JP | 1241076 | 4/1989 |
| JP | 2173992 | 7/1990 |
| JP | 4332982 | 11/1997 |

\* cited by examiner

*Primary Examiner*—David Davis
(74) *Attorney, Agent, or Firm*—Jay H. Maioli

(57) ABSTRACT

A tape cassette includes a cassette housing composed of an upper cassette part and a lower cassette part, a slider slidably attached to the cassette housing so as to open and close an opening in the lower surface of the housing, a slider lock portion provided on the lower cassette part to lock the slider at a predetermined position, and an engagement aperture bored through the slider so as to oppose an engagement portion of the slider lock portion for engagement therewith, which has an inclined portion formed at one end. Further, the tape cassette includes a protruded pin projected from the upper cassette part opposing the slider lock portion, and a spring fit around the protruded pin and interposed between the slider lock portion and the upper cassette part such that the slider lock portion is biased in a direction of engagement with the engagement aperture, wherein at least one end portion of the spring is bent toward the inside of a coil winding portion to form a pin supporting portion which is wound around the protruded pin.

1 Claim, 8 Drawing Sheets

MAGNETIC TAPE CASSETTE SLIDER LOCK MECHANISM WITH TAPERED SURFACES AND COIL SPRING BIAS

BACKGROUND OF THE INVENTION

1. Field of the Invention

The present invention generally relates to a magnetic tape cassette for use with a digital audio tape recorder (DAT) or the like and, more particularly, is directed to a magnetic tape cassette in which a slider can be reliably engaged with a lower cassette part at a predetermined position.

2. Description of the Prior Art

Conventional tape recorders such as a digital audio tape recorder (DAT) or the like employ a magnetic tape cassette which is generally depicted by reference numeral 11 in FIGS. 1 to 3, for example.

As illustrated, in the case of the magnetic tape cassette for the DAT, a magnetic tape T is protected not only by upper and lower cassette parts 2, 3 but also by a lid 7, a slider 8 or the like in order to prevent a drop-out from occurring in a reproduced signal when the surface of the magnetic tape T is smudged by fingermarks, oily components, dust or the like.

A pair of reel hubs 5a, 5b around which the magnetic tape T is wound is accommodated within a cassette housing 4 that is composed of the upper cassette shell or part 2 and the lower cassette shell or part 3 which are fastened together by some suitable means such as screws or the like. A transparent window 2a is formed on the upper cassette part 2 so that the user can visually confirm the remaining amount of the magnetic tape T wrapped around the reel hubs 5a and 5b. Also, in order to prevent the magnetic tape T from being exposed through a mouth portion 6 of the cassette housing 4 when the magnetic tape cassette 11 is not in use or when the magnetic tape cassette 11 is preserved, a lid 7 is pivotally attached to the front portion of the cassette housing 4 such that the lid 7 becomes freely rotatable in the upper direction. The lid 7 is constantly spring-biased by a spring (not shown) in the direction in which the lid closes the mouth portion 6.

The slider 8 is provided on the lower cassette part 3 so that it slides along the lower cassette part 3 back and forth (in the directions shown by arrows a and b in FIGS. 2A, 2B) to thereby open and close the mouth portion 6. The slider 8 has bored therethrough a pair of reel shaft insertion apertures 8b, 8b that communicate with a pair of reel shaft insertion apertures 3b, 3b bored through the lower cassette part 3 at the opening position of the mouth portion 6. The slider 8 is constantly spring-biased by a slider spring S in the forward direction (in the arrow a direction (see FIG. 2A) in which the slider 8 closes the mouth portion 6) relative to the lower cassette part 3.

When the magnetic tape cassette 11 thus arranged is not in use, as shown in FIG. 2A, the lid 7 closes the front portion of the mouth portion 6 and the slider 8 closes the lower portion of the mouth portion 6, whereby the magnetic tape T extended within the mouth portion 6 is isolated from the outside. The reel shaft insertion apertures 3b of the lower cassette part 3 and the reel shaft insertion apertures 8b of the slider 8 are not coincident with one another and the slider 8 closes the reel shaft insertion apertures 3b of the lower cassette part 3, thereby preventing the inside of the cassette housing 4 from being smudged by dust or the like.

When the magnetic tape cassette 11 is loaded onto a recording and reproducing apparatus such as the DAT or the like, as shown in FIG. 2B, the slider 8 is slid rearward of the cassette housing 4 (in the arrow b direction) and then held. Also, the lid 7 is rotated upwardly to open the front portion and the lower surface of the mouth portion 6.

Under this condition, a tape loading guide member (not shown) on the recording and reproducing apparatus side can be inserted into the mouth portion 6 of the cassette housing 4. Also, the reel shaft insertion apertures 8b, 8b of the slider 8 become coincident with the reel shaft insertion apertures 3b, 3b of the lower cassette half 3, whereby reel shafts (not shown) of the recording and reproducing apparatus can be inserted into the reel shaft insertion apertures 3b, 8b.

When the magnetic tape cassette 11 is not in use, the slider 8 is moved forwardly and held at the position at which the slider closes the mouth portion 6. When the magnetic tape cassette 11 is loaded onto the recording and reproducing apparatus, the slider 8 is moved backwardly and then held at the position at which the slider opens the mouth portion 6. In order to hold the slider 8 at the respective predetermined positions, two pairs of engagement apertures 8c, 8c and 8d, 8d are bored through the slider 8 at two positions in the arrow b direction in FIG. 2B and a pair of slider lock portions 3c, 3c of pin-configuration that can be engaged with the engagement apertures 8c, 8c and 8d, 8d are formed on the lower cassette part 3.

As shown in FIGS. 1 and 3, the slider lock portions 3c, 3c are formed by cutting one portion of the lower cassette part 3. These slider lock portions 3c, 3c have a spring-biasing property so that the respective engagement protrusions 3d, 3d formed on the tops thereof are constantly spring-biased so as to return to the direction in which the engagement protrusions 3d, 3d are engaged with the engagement apertures 8c or 8d of the slider 8. In order to prevent the returning force of the slider lock portions 3c, 3c from being reduced when the lower cassette part 3 is deformed by the deterioration of the material forming the lower cassette part 3, it is proposed that compression coil springs (hereinafter referred to as slider lock springs) 9, 9 be respectively interposed between the engagement protrusions 3d, 3d of the slider lock portions 3c, 3c and the upper cassette part 2.

FIG. 3 of the accompanying drawings shows an example of the slider lock spring 9 that the assignee of the present application has previously proposed (see Japanese Patent Application No. 3-48741). As shown in FIG. 3, the slider lock spring 9 comprises a spring body portion 9a formed of a coil spring whose inner diameter is progressively increased upwardly and an elongated portion 9b that is linearly elongated from the upper end edge of the spring body portion 9a. The coil spring is doubly wound around only the upper and lower end portions tightly.

In the slider lock springs 9, 9 thus arranged, the spring body portions 9a, 9a are wound around a pair of pins 2b, 2b protruded from the inner side surface of the upper cassette part 2 in response to the inner surface sides of the tops of the engagement protrusions 3d, 3d of the slider lock portions 3c, 3c. The elongated portion 9b is welded (fixed by a caulking process) to a recess 2d of a fixed portion 2c of the upper cassette part 2. Therefore, the slider lock springs 9, 9 can be prevented from disenging from the upper cassette part 2 and come in contact with the inner end faces of the engagement protrusions 3d, 3d of the slider lock portions 3c, 3c to downwardly press the engagement protrusions 3d, 3d, thereby reinforcing the spring-biasing force of the slider lock portions 3c, 3c.

The above conventional magnetic tape cassette 11, however, suffers from the following disadvantages:

That is, if the spring-biasing force of the slider lock spring 9 is increased, although the returning force of the slider lock portion 3c is reinforced more effectively, a force (opening force) that is required to open the slider 8 must be increased because the top end faces of the respective engagement protrusions 3d are brought in parallel contact with the respective engagement apertures 8c when the engagement protrusions 3d of the slider lock portions 3c are disengaged from the engagement apertures 8c of the slider 8.

There is then the antinomy that, while the spring-biasing force of the slider lock spring 9 cannot be set to a too large a value, the small spring-biasing force of the slider lock spring 9 cannot achieve a reinforcing effect of the slider lock portion 3 sufficiently, thereby locking the slider 8 in the unstable locked condition.

Moreover, the above conventional magnetic tape cassette cannot overcome the shortcomings which follow:

Welding fixing by the caulking process) the slider lock spring on the upper cassette part is not advantageous in conformability when the magnetic tape cassette is assembled by machines or the like.

When the slider lock spring is of a tight-winding type, a difference between the inner diameter of the slider lock spring and the outer diameter of the pin on the upper cassette part can be reduced so that the slider lock spring can be fitted into the pin with a small pressure. Since the difference between the inner diameter of the slider lock spring and the outer diameter of the pin on the upper cassette half is set to be small, such difference is not suitable for mounting the slider lock spring that is hard to deform at the tight-winding portion of the slider lock spring.

OBJECTS AND SUMMARY OF THE INVENTION

Therefore, it is an object of the present invention to provide an improved magnetic tape cassette in which the aforesaid shortcomings and disadvantages encountered with the prior art can be eliminated.

More specifically, it is an object of the present invention to provide a magnetic tape cassette in which a force required to open a slider can be suppressed to be small while a spring-biasing force for reinforcing a slider block portion can be set to be large.

It is another object of the present invention to provide a magnetic tape cassette in which a slider lock spring can be fitted into a pin with a small pressure.

It is still another object of the present invention to provide a magnetic tape cassette in which a slider lock spring can be easily assembled on an upper cassette part by an automatic assembling apparatus.

It is a further object of the present invention to provide a magnetic tape cassette which is suitable for use with a digital audio tape recorder (DAT) or the like.

As a first aspect of the magnetic tape cassette according to the present invention, in order that a slider, slidably attached to a lower cassette part so as to open and close a mouth portion of a cassette housing, be locked at a predetermined position, a slider lock portion is provided on the lower cassette part, an engagement aperture that is engaged with the slider lock portion is bored through the slider and a spring is interposed between the slider lock portion and an upper cassette part to thereby spring-bias the slider lock portion in the direction in which the slider lock portion is fitted into the engagement aperture. This magnetic tape cassette further includes an inclined portion having a configuration tapered toward a cassette housing being formed on one end face of the engagement aperture bored through the slider which opposes the top of the slider lock portion of the lower cassette part.

As a second aspect of the magnetic tape cassette according to the present invention, in order to lock a slider slidably attached to a lower cassette part at a predetermined position, a slider lock spring, that is fitted into a pin projected from an upper cassette part, is interposed between the slider lock portion provided on the lower cassette part and the upper cassette part to thereby spring-bias the slider lock portion in the direction in which the slider lock portion is fitted into the engagement aperture. In this magnetic tape cassette, at least one end portion of the slider lock spring is bent toward the inside of a coil winding portion to form a pin supporting portion.

The above-mentioned and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Figure 1:
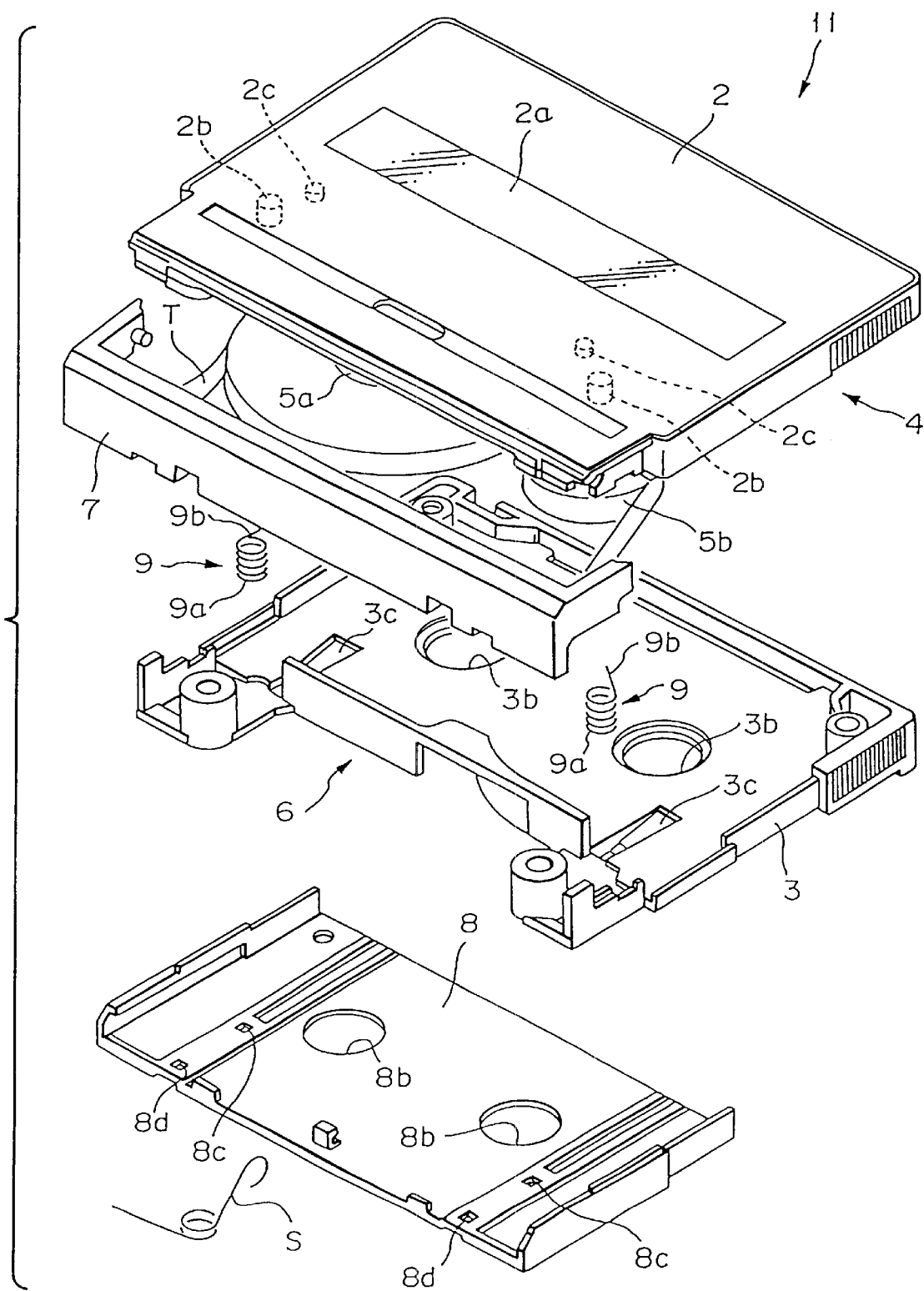
FIG. 1 is an exploded perspective view showing an example of a magnetic tape cassette according to the prior art.
Figure 2A:
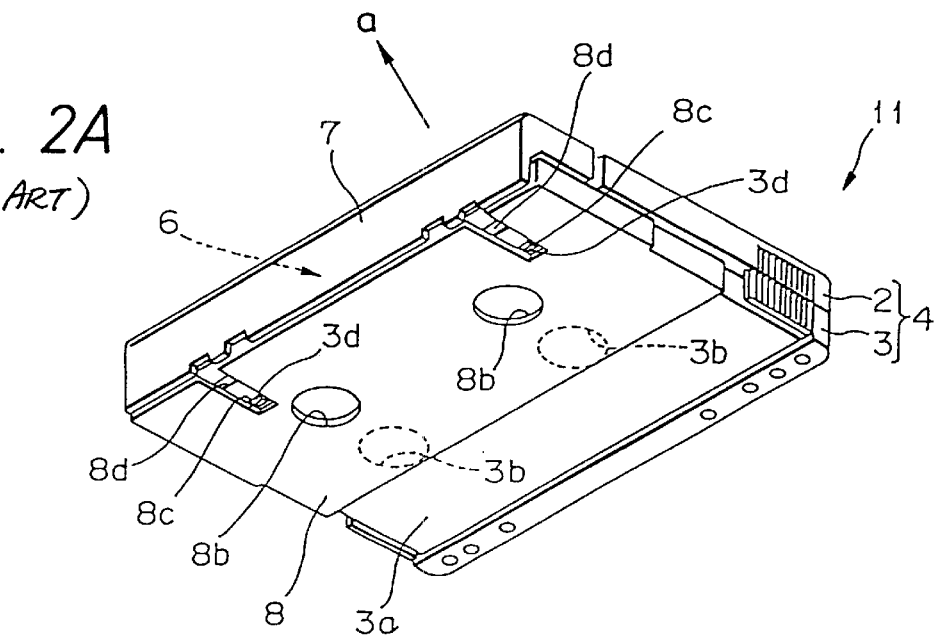
FIGS. 2A and 2B are perspective views, respectively, showing the conventional magnetic tape cassette shown in FIG. 1 and to which references will be made in explaining a lower surface of the magnetic tape cassette when the magnetic tape cassette i s in use.
Figure 2B:
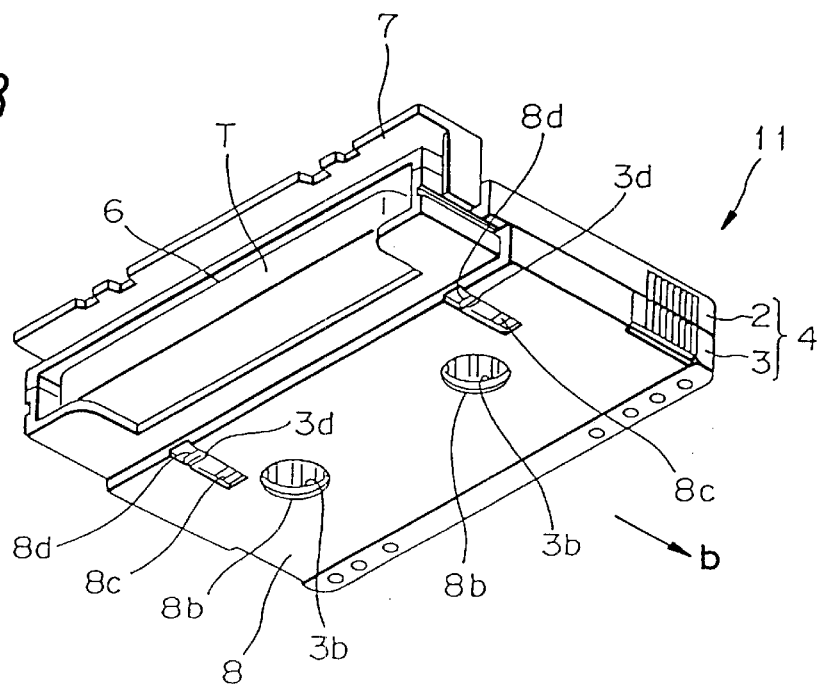
Figure 3:
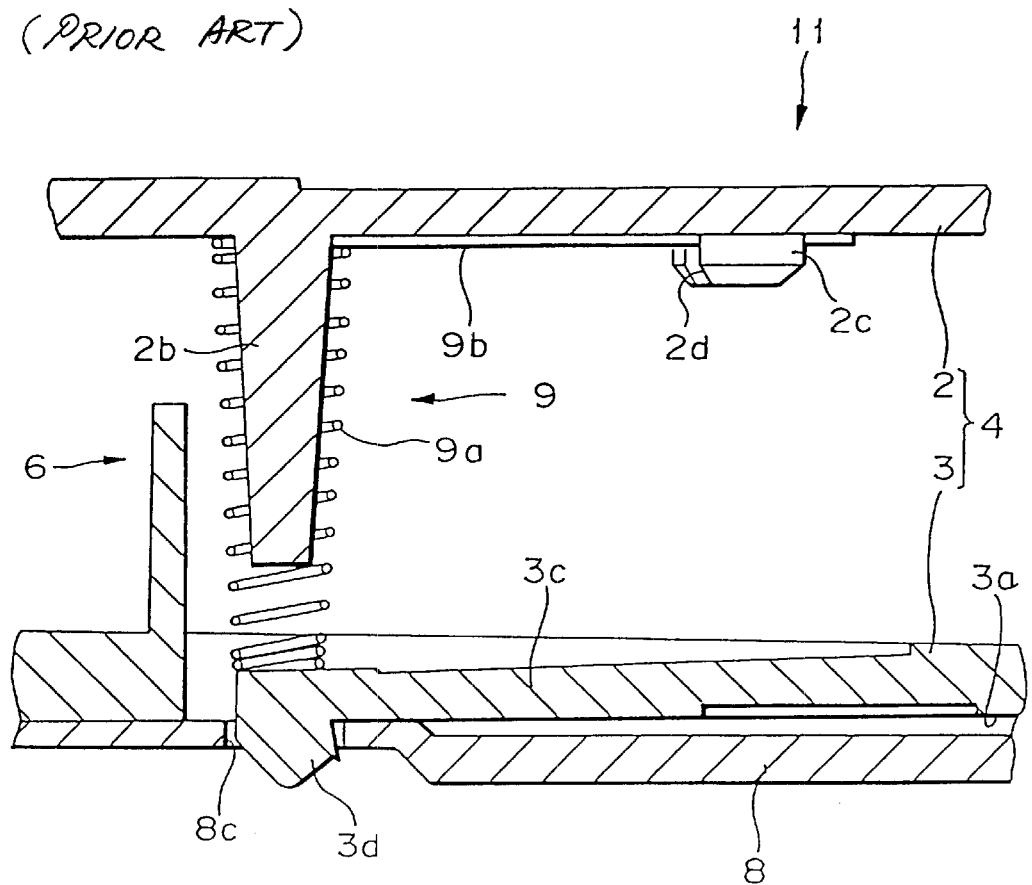
FIG. 3 is a side view showing a slider lock portion of the conventional magnetic tape cassette in a fragmentarily-enlarged scale.

A magnetic tape cassette according to a first embodiment of the present invention will hereinafter be described with reference to FIGS. 4A, 4B to FIG. 6. Throughout FIGS. 4A, 4B to FIG. 6, parts and elements identical to those of the conventional magnetic tape cassette 11 according to the prior art shown in FIGS. 1 to 3 are marked with the same references and therefore need not be described in detail.

In a magnetic tape cassette 11 according to the first embodiment of the present invention, similarly to the conventional magnetic tape cassette 11 according to the prior-art example, the upper cassette part 2 and the lower cassette part 3 are combined to form the cassette housing 4. The pair of reel hubs 5a, 5b around which the magnetic tape T is wound are accommodated within the cassette housing 4. The window 2a that enables the user to visually confirm the remaining amount of the magnetic tape T is formed on the upper cassette part 2. The lid 7 and the slider 8 for opening and closing the mouth portion 6 are formed on the upper cassette part 2 and the lower cassette part 3, respectively.

In order to hold the slider 8 in either the condition that the mouth portion 6 is opened or closed, the slider lock portions 3c are provided on the lower cassette part 3. Also, the engagement apertures 8c, 8d that are in engagement with the slider lock portions 3c are bored through the bottom portion of the slider 8. A spring 10 is interposed between the slider lock portions 3c and the pins 2b of the upper cassette part 2 to thereby spring-bias the slider lock portions 3c in the direction in which they are fitted into the engagement apertures 8c or 8d.

According to the first embodiment of the present invention, in addition to the above-mentioned arrangement, inclined portions 8c1, 8c1 which are inwardly tapered are formed on one end faces of the engagement apertures 8c, 8c of the slider 8 in an opposing relation to the top surfaces of the engagement protrusions 3d, 3d formed on the tops of the slider lock portions 3c of the lower cassette part 3, respectively, when the slider 8 closes the mouth portion 6. Thus, when the slider 8 is slid along the lower cassette part 3 backwardly (in the direction shown by an arrow c in FIGS. 4A and 6), the engagement protrusions 3d of the slider lock portions 3c of the lower cassette part 3 can be disengaged from the engagement apertures 8c of the slider 8 with ease.

Figure 4A:
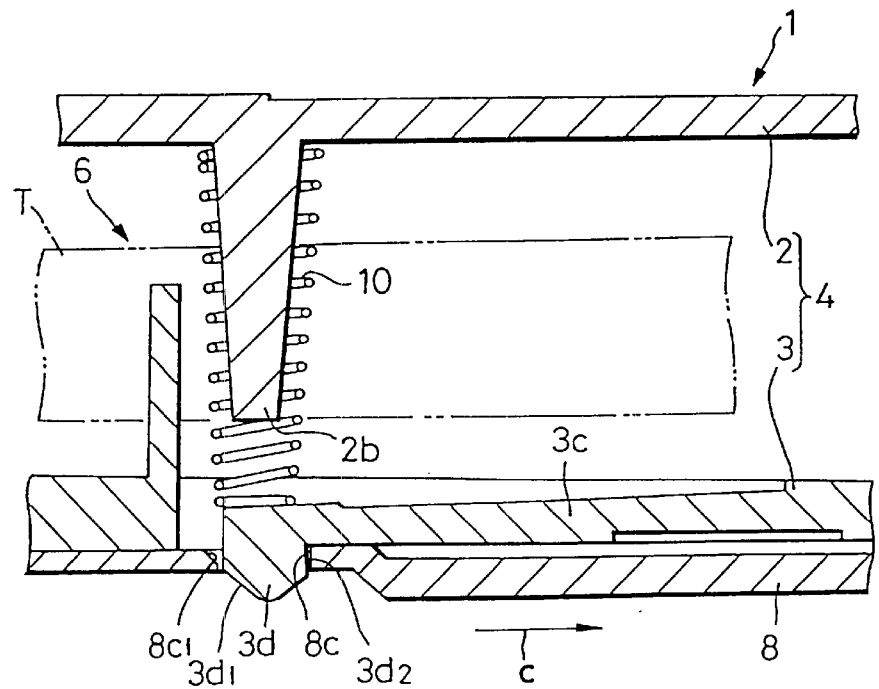
FIGS. 4A and 4B are fragmentarily-enlarged cross-sectional views, respectively, used to explain the condition that a slider lock portion of a magnetic tape cassette according to a first embodiment of the present invention is being operated when the magnetic tape cassette is in use.
Figure 4B:
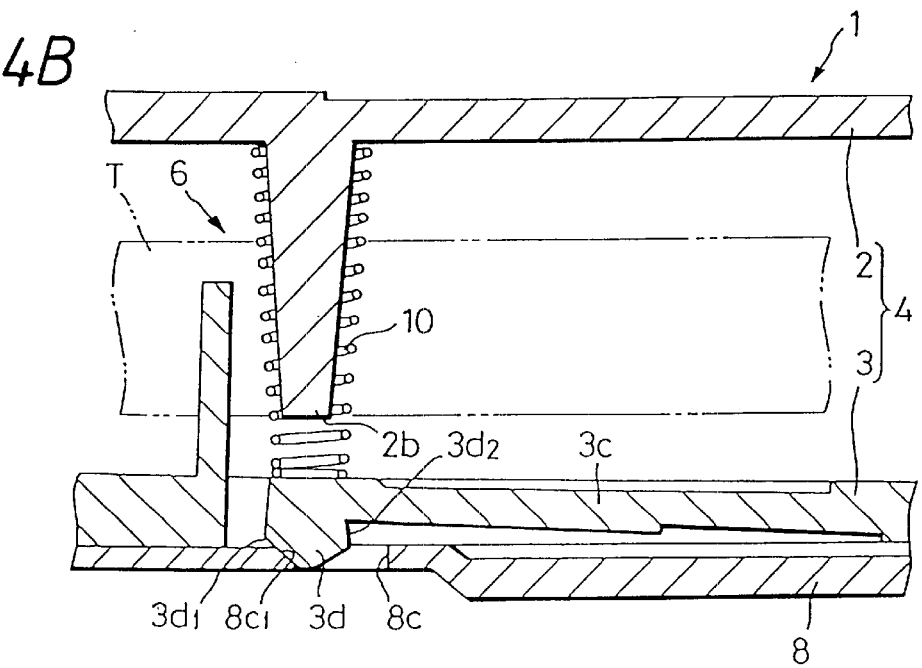
Figure 5:
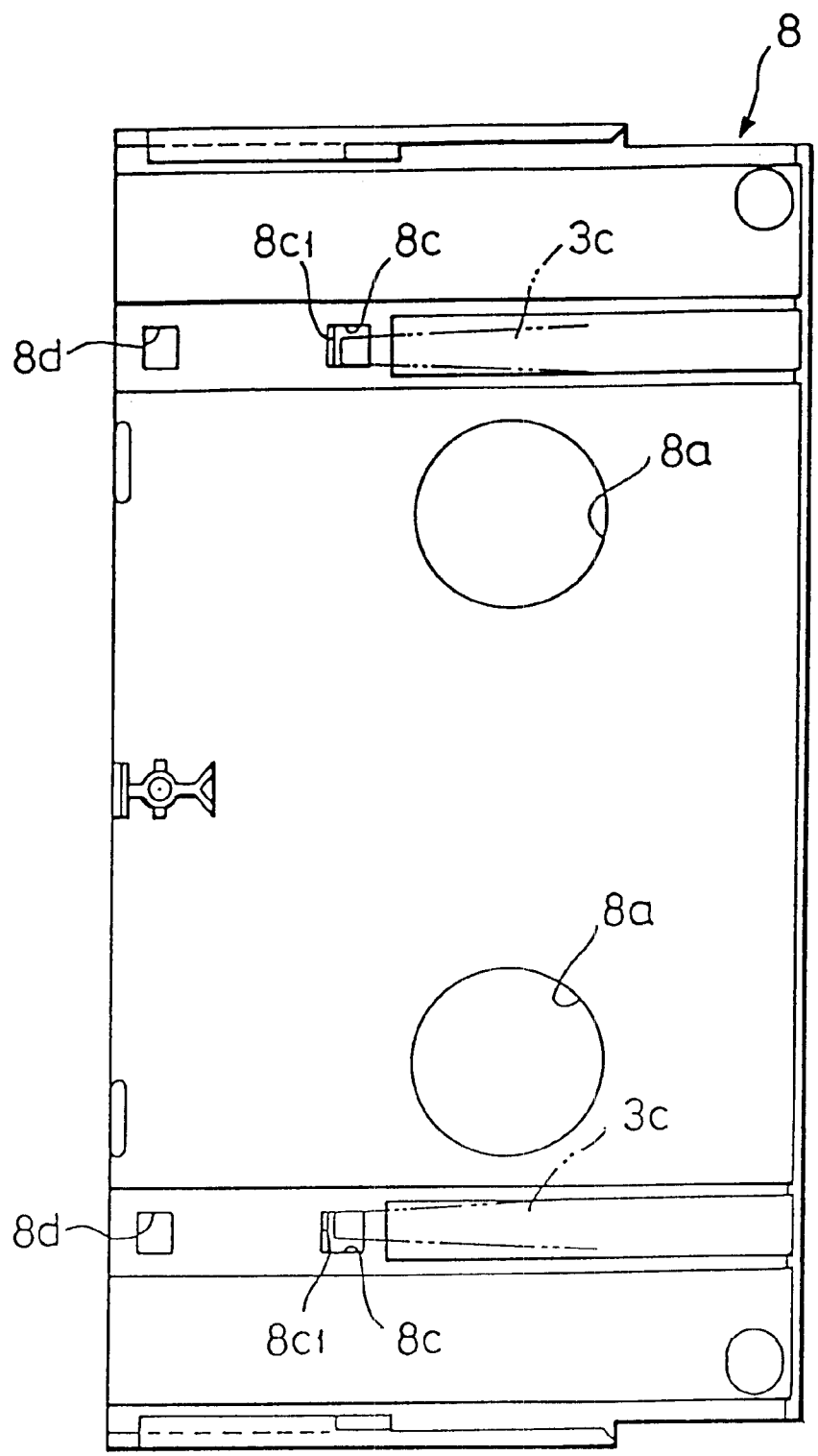
FIG. 5 is a plan view showing a slider of the magnetic tape cassette according to the present invention in an enlarged scale.
Figure 6:
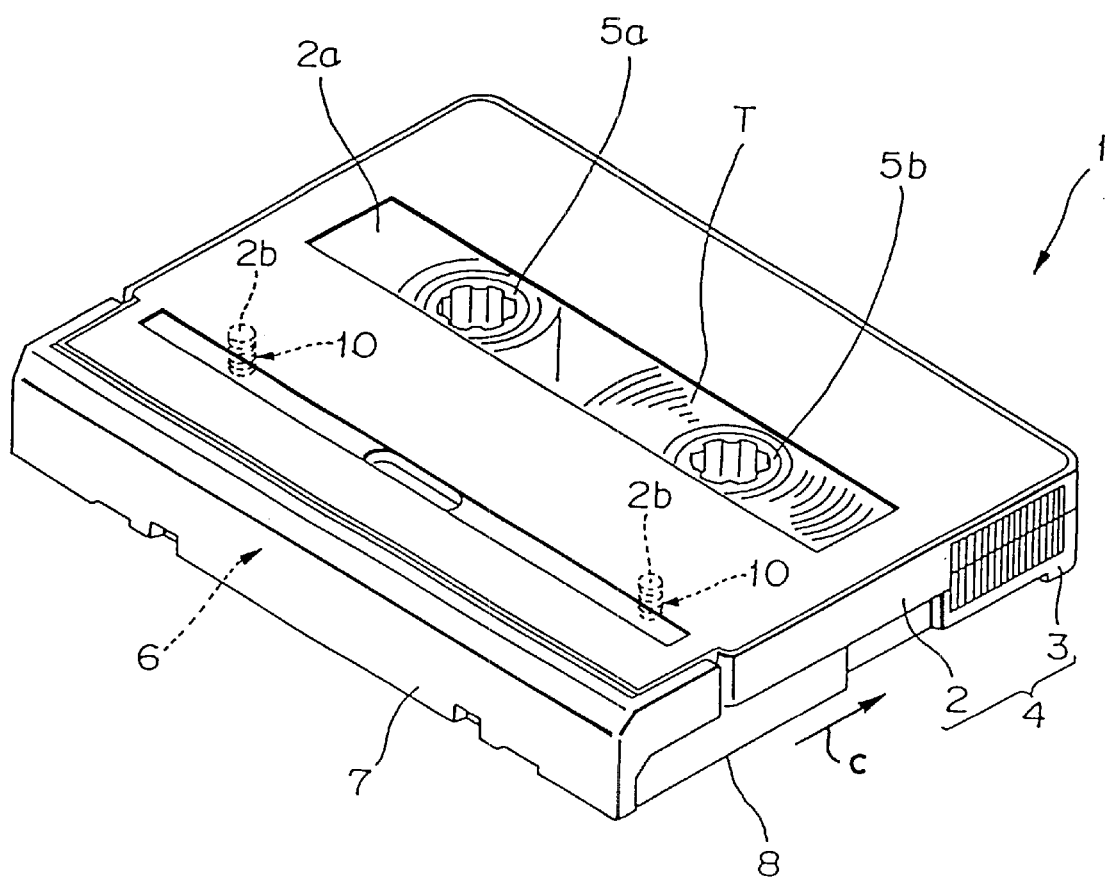
FIG. 6 is a perspective view showing an overall arrangement of the magnetic tape cassette according to the present invention.

As shown in FIGS. 4A, 4B and FIG. 5, the engagement apertures 8c, 8c are substantially square in shape and a little larger than the planar shapes of the engagement protrusions 3d.

According to the first embodiment of the present invention, the inclined angles of the inclined portions 8c1, 8c1 are substantially the same as those of inclined surfaces 3d1, 3d1 formed on the top surfaces of the engagement protrusions 3d of the slider lock portion 3c.

The magnetic tape cassette 11 according to the first embodiment of the present invention acts as follows when it is being loaded onto a recording and reproducing apparatus from its preserved state.

When the magnetic tape cassette 11 is preserved or not in use, the mouth portion 6 is closed by the lid 7 and the slider 8, and as shown in FIG. 4A, a rear end face 3d2 of the engagement protrusion 3d on the lower cassette part 3 is brought in contact with the rear end of the engaging aperture 8c of the slider 8, thereby holding the slider 8 ahead of the lower cassette part 3. At that time, the reel shaft insertion apertures 3b, 3b of the lower cassette part 3 also are closed by the slider 8.

When the magnetic tape cassette 1 is loaded onto the recording and reproducing apparatus, the slider 8 is progressively moved rearward of the cassette housing 4 so that, as shown in FIG. 4B, the engagement protrusion 3d is progressively moved over the upper surface of the slider 8 while the inclined surface 3d1 is in slidable contact with the inclined portion 8c1 of the engagement aperture 8c.

When the slider 8 finishes having moved rearward under the condition that the engagement protrusion 3d is moved over the upper surface of the slider 8, the front engagement aperture 8d of the slider 8 and the engagement protrusion 3d become coincident with each other. Then, the engagement protrusion 3d is fitted into the engagement aperture 8d by the spring-biasing force of the spring 10.

The slider 8 is held at the predetermined position under the condition such that the lower portion of the mouth portion 6 is opened and that the reel shaft insertion apertures 3b, 8b of the lower cassette part 3 and the slider 8 become coincident with each other. Then, the reel shafts (not shown) on the recording and reproducing apparatus can be inserted into the cassette housing 4.

After a sequence of the above operation is finished, the lid 7 that closes the front portion of the mouth portion 6 is rotated upwardly to open the front portion of the mouth portion 6 and then a tape loading guide member on the recording and reproducing apparatus is inserted into the mouth portion 6, thereby recording and/or reproducing the magnetic tape T.

As described above, according to the magnetic tape cassette 1 of the present invention, the front end surface of the engagement protrusion 3d of the slider lock portion 3c on the lower cassette part 3 and the inclined portion 8c1 formed on the front end of the engagement aperture 8c come in contact at each other with a predetermined angle in an opposing relation, resulting in the engagement protrusion 3d being readily moved toward the upper direction along the upper surface of the slider 8.

Since the inclined portion 8c1 moves the slider 8 backwardly while controlling an amount with which the engagement aperture 8c and the engagement protrusion 3d are brought in contact with each other, it becomes possible to suppress a force that is required to open the mouth portion 6.

Consequently, the spring-biasing force with which the spring 10 reinforces the slider block portion 3c can be set to be larger than that required by the prior art. Therefore, the spring-biasing force, which is weakened by the deformed slider block portion 3c when the magnetic tape cassette 1 is not in use, can be reinforced more effectively.

The magnetic tape cassette according to a second embodiment of the present invention will be described with reference to FIG. 7 and FIGS. 8A, 8B, in which parts and elements identical to those of the first embodiment are marked with the same references and therefore need not be described.

Figure 7:
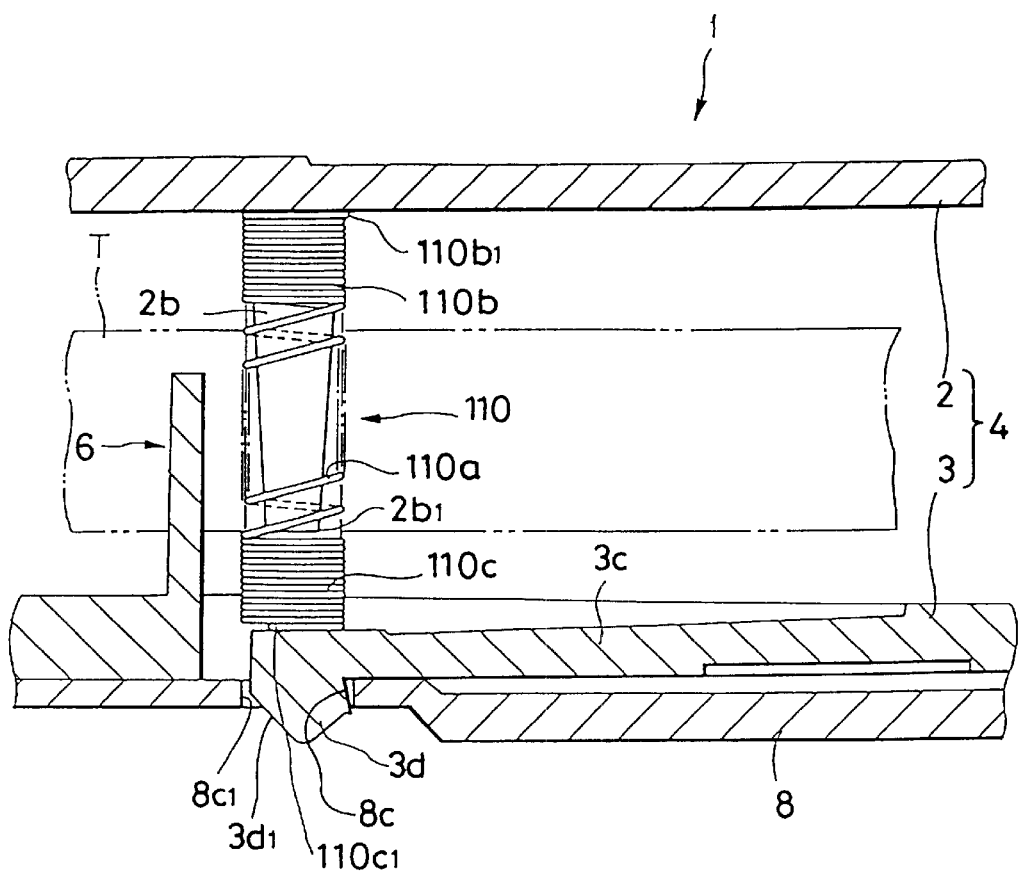
FIG. 7 is a longitudinal cross-sectional side view showing the magnetic tape cassette according to a second embodiment of the present invention in a fragmentarily-enlarged scale.

As shown in FIG. 7, in the magnetic tape cassette 1 according to the second embodiment of the present invention, a slider lock spring 110 comprises a central spring body portion 110a, tight-winding portions 10b, 110c respectively formed on the upper and lower portions of the spring body portion 110a, a pin supporting portion 110b1 and a slider lock pressing portion 10c1. The pin supporting portion 110b1 and the slider lock pressing portion 10c1 are formed by linearly elongating the upper and lower end portions of the tight-winding portions 110b, 110c toward the inside of the slider lock spring 110, respectively.

Figure 8A:
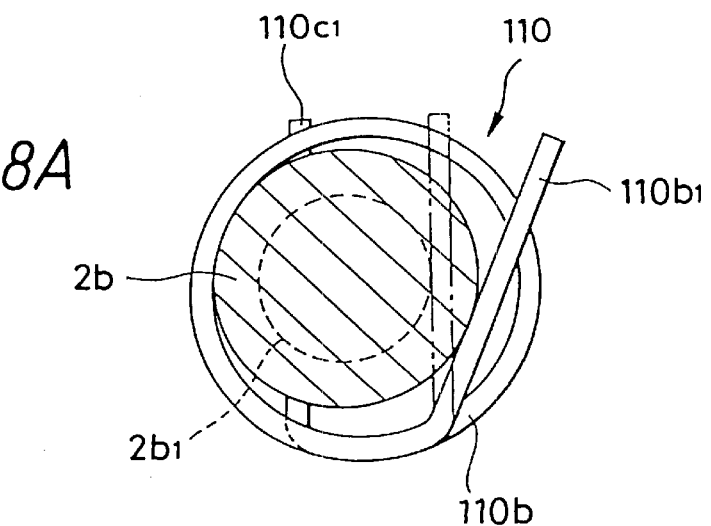
FIGS. 8A and 8B are respectively an enlarged plan view and an enlarged bottom view showing a slider lock spring used in the magnetic tape cassette according to the second embodiment of the present invention.
Figure 8B:
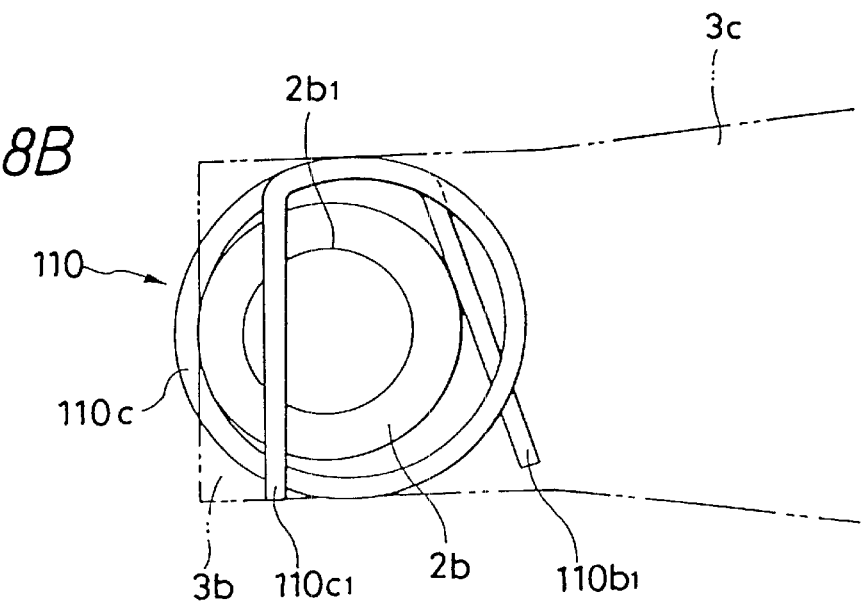

Under the condition that the slider lock spring 110 is not yet assembled on the upper cassette part 2, the pin supporting portion 110b1 of the slider lock spring 110 is located in the inside of the slider lock spring 110 as shown by a two-dot chain line in FIG. 8A, thereby making the inner diameter of the slider lock spring 110 smaller than the outer diameter of the pin 2b. The slider lock pressing portion 10c1 also is formed about the center of gravity of the slider lock spring 110 so as to become symmetrical with the aforementioned pin supporting portion 110b1. The pin supporting portion 110b1 can serve also as the slider lock pressing portion 10c1 in a function standpoint and vice versa.

According to the second embodiment of the present invention, the magnetic tape cassette 1 acts as follows when the slider lock spring 110 is assembled on the upper cassette part 2.

As the pin supporting portion 110b1 of the slider lock spring 110 is progressively and deeply inserted into the pin 2b from a tapered lower end edge 2b1 of the pin 2b, the pin supporting portion 110b1 is progressively widened outwardly with a pressure to produce a spring-biasing force and the pin supporting portion 110b1 supports at its inside the pin 2b of the upper cassette part 2 with a constant spring-biasing force. Thus, the slider lock spring 110 is fitted into the pin 2b of the upper cassette part 2 with a small pressure. In that case, without the welding process or the like, the slider lock spring 110 is applied at its pin supporting portion 110b1 with a load when it is fitted into the pin 2b with a small pressure so that the slider lock spring 110 can be fitted into the pin 2b of the upper cassette part 2 easier than the conventional slider lock spring 9.

When the upper and lower cassette parts 2 and 3 are fastened together, the slider lock spring 110 can be prevented from being disengaged from the upper cassette part 2. Furthermore, after the assembly process, the slider lock pressing portion 110c1 constantly presses the slider lock portion 3c of the lower cassette part 3 in the lower direction, thereby reinforcing the downward biasing force of the slider lock portions 3c, 3c.

As set out, according to the magnetic tape cassette 1 of the second embodiment of the present invention, if the slider lock spring 110 is solely applied to the magnetic tape cassette 1 without modifying the arrangements of the upper and lower cassette parts 2 and 3, then the slider lock spring 110 can be fitted into the pin 2b of the upper cassette part 2 easily and reliably, resulting in the slider lock portion 3c of the lower cassette part 3 being reinforced.

In particular, since the slider lock spring 110 includes the pin supporting portion 110b1 and the slider lock pressing portion 10c1 that are symmetrical in shape, the top and bottom of the slider lock spring 110 need not be specified and the slider lock spring 110 becomes easy to handle. As a consequence, since the slider lock spring 110 can be fitted at its pin supporting portion 110b1 into the pin 2b of the upper cassette part 2 with a small pressure, the slider lock spring 110 can be automatically assembled on the upper cassette part 2 with ease by a machine or the like.

In the first embodiment of the present invention, the shape of the inclined portion 8c1 is not limited to the above inwardly-tapered one in cross section and any shape may be possible insofar as the engagement protrusion can be pushed over the upper surface of the inclined portion 8c1 with ease.

In the second embodiment of the present invention, the planar shape of the slider lock spring 110 may be replaced with a true circular shape or polygonal shape. Further, the shapes of the pin supporting portion 110b1 and the slider lock pressing portion 110c1 are not limited to the above straight line shapes and may be curved shapes insofar as the slider lock spring 110 can be fitted into the pin 2b of the upper cassette part 2 with a small pressure.

As set out, according to the magnetic tape cassette of the present invention, since the slider lock portion can be disengaged from the engagement aperture with ease, a force that is used to open the slider when the magnetic tape cassette is loaded onto the recording and reproducing apparatus can be suppressed to be small. There is then the effect such that a biasing force with which the slider lock spring reinforces the slider lock portion can be set to be larger.

Furthermore, according to the magnetic tape cassette of the present invention, since the slider lock spring need not be welded (fixed by the caulking process) on the upper cassette part, the slider lock spring can be assembled into the upper cassette part with ease. As a consequence, it becomes possible to assemble the slider lock spring into the upper cassette part more easily and reliably by an automatic assembling machine or the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape cassette comprising:

(a) a cassette housing composed of an upper cassette part and a lower cassette part and which accommodates therein a pair of tape hubs around which a magnetic tape is wound;

(b) a slider slidably attached to said cassette housing so as to open and close a lower surface opening portion of said cassette housing;

(c) a slider lock portion provided on said lower cassette part to lock said slider at a predetermined position and having an engagement protrusion with an inclined surface;

(d) an engagement aperture bored through said slider and having an inclined portion tapered toward an outside of said slider formed on one end face of said engagement aperture such that said inclined portion is complementary to said inclined surface of said engagement protrusion for engagement with said inclined surface of said engagement protrusion of said slider lock portion;

(e) a protruded pin projected from said upper cassette part toward said slider lock portion; and (f) a slider lock spring mounted on said protruded pin and interposed between said slider lock portion and said upper cassette part, said slider lock portion being spring-biased by said slider lock spring in a direction in which said inclined surface of said engagement protrusion of said slider lock portion is engaged in said engagement aperture, wherein at least one end portion of said slider lock spring is bent toward an inside of a coil portion of said spring to form a pin supporting portion which is wound around said protruded pin and wherein said slider lock spring includes a tight-winding portion formed at least on one end in the longitudinal direction of said spring.

* * * * *